C. HEBERT.
SOIL PULVERIZER.
APPLICATION FILED JAN. 23, 1918.
1,357,235.
Patented Nov. 2, 1920.
2 SHEETS—SHEET 1.
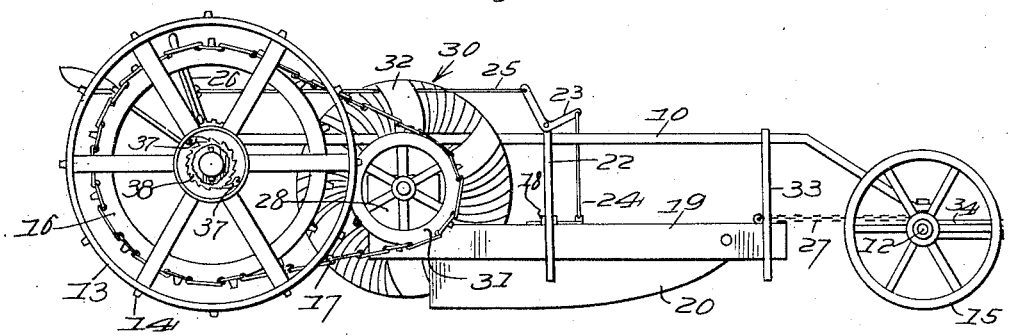
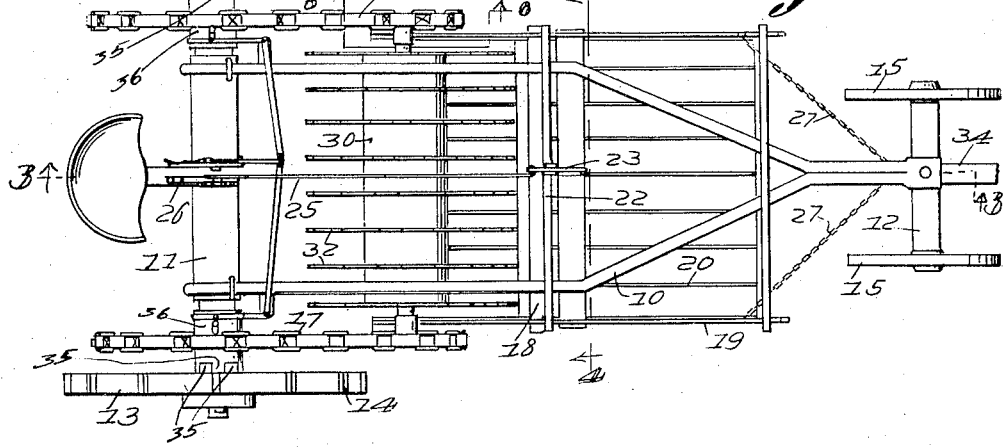
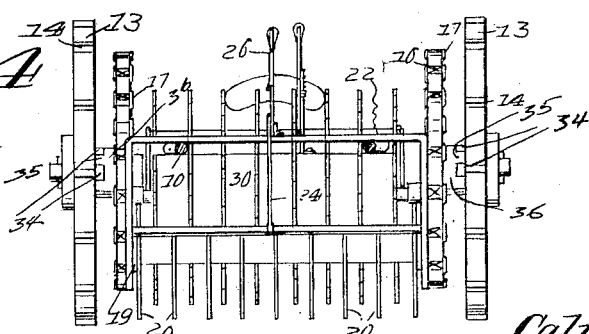
Witnesses
C. D. C. Brown
H. M. Test
Inventor
Calixte Hebert,
By Chandler & Chandler
Attorneys

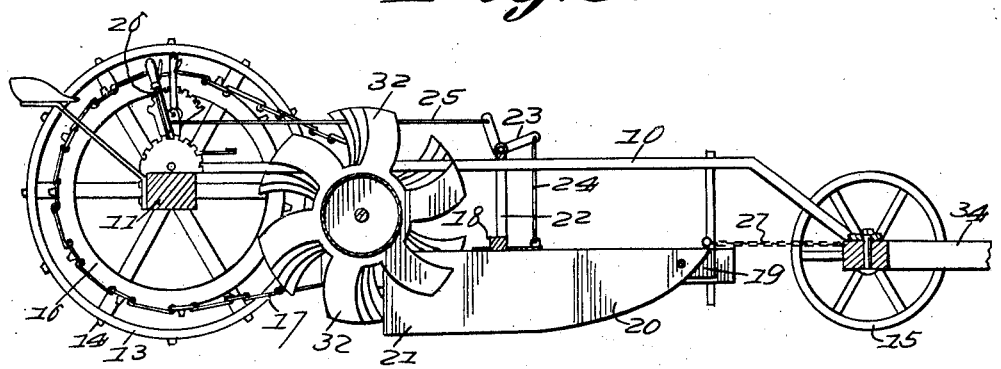
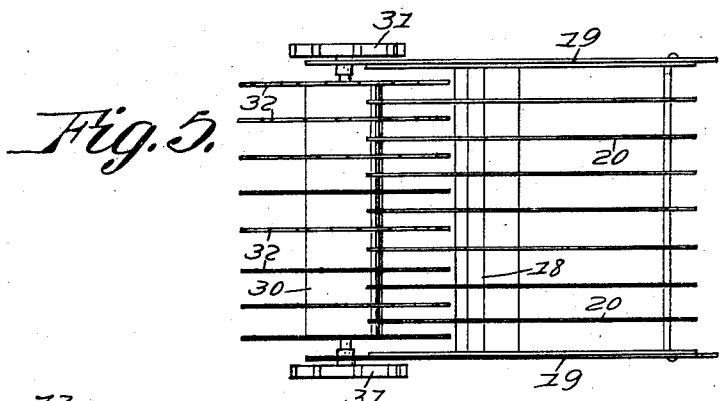
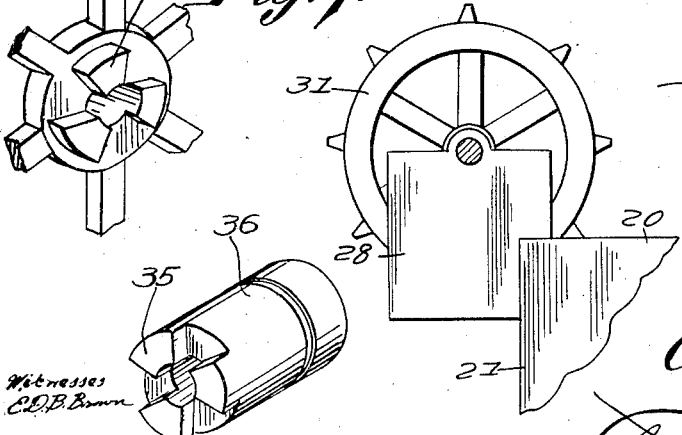

UNITED STATES PATENT OFFICE.

CALIXTE HEBERT, OF PARMA, IDAHO.

SOIL-PULVERIZER.

1,357,235.

Specification of Letters Patent.

Patented Nov. 2, 1920.

Application filed January 23, 1918. Serial No. 213,336.

*To all whom it may concern:*

Be it known that I, CALIXTE HEBERT, a citizen of the United States, residing at Parma, in the county of Canyon, State of Idaho, have invented certain new and useful Improvements in Soil-Pulverizers; and I do hereby declare the following to be a full, clear, and exact description of the invention, such as will enable others skilled in the art to which it appertains to make and use the same.

This invention relates to improvements in agricultural machines and particularly to devices for breaking up or pulverizing the soil.

One object of the present invention is to provide an improved structure of this character which will effectively grind the soil and deposit the same on the ground in a fine mellow condition and with the expenditure of the minimum of power.

Another object of the invention is to provide a device which is simple in construction, and easy and effective in operation.

Other objects and advantages will be apparent from the following description when taken in connection with the accompanying drawing.

In the drawings:

Figure 1 is a side elevation of a soil pulverizing machine made in accordance with my invention.

Fig. 2 is a top plan view of the same.

Fig. 3 is a vertical longitudinal sectional view taken on the line 3—3 of Fig. 2.

Fig. 4 is a vertical transverse sectional view taken on the line 4—4 of Fig. 2.

Fig. 5 is a bottom plan view of the forward portion of the machine.

Fig. 6 is a sectional view taken on the line 6—6 of Fig. 2.

Fig. 7 is a perspective view of the wheel carried portion of the clutch.

Fig. 8 is a perspective view of the axle carried portion of the clutch.

Referring particularly to the accompanying drawing, 10 represents a frame, one end of which is connected to the axle 11, while the other end is pivotally connected to a shorter front axle 12. The first axle is provided with the ground engaging wheels 13 having the traction lugs 14, while the front axle carries the smaller ground engaging wheels 15. Carried by the inner portions of the larger wheels 13 are the large sprocket wheels 16, over which are engaged the sprocket chains 17.

Disposed beneath the frame 10, and between the front and rear axles, is a frame 18 which includes the longitudinally extending members or bars 19. Disposed between each pair of bars is a depending and longitudinally extending cutting blade 20, the rear ends of which extend a suitable distance rearwardly of the said bars, as shown at 21. Carried by the frame 10, and depending therefrom, is a yoke member 22, the arms of which engage with the sides of the frame 18 for the purpose of preventing lateral movement of the said frame while at the same time permitting the free upward and downward movement of the frame. Mounted on this yoke member is an angle lever or arm 23 one arm of which is pivotally connected with the frame 18 by means of the depending link 24, while the other arm has pivotally connected thereto the horizontal and rearwardly extending link 25. On the rear axle is pivotally mounted the operating lever 26, and to this lever is pivotally connected the rear end of the link 25. Thus when the lever 26 is swung on its pivot, the frame 18 will be raised or lowered.

Connecting the front axle with the forward end of the frame 18, are forwardly converging chains 27, these chains serving to pull the frame 18 as the machine proceeds, with the result that the cutting blades will be drawn through the ground and slice the same into longitudinally extending strips.

On the rear portions of the frame 18 are carried the bearings 28 which support the trunnions 29 of the rotatable drum 30, said trunnions being provided with the smaller sprocket wheels 31 around which the beforementioned drive chains 17 are also engaged and whereby the said drum is rotated while the machine is in motion. Fixed on the peripheral face of the drum are the longitudinal series of radial cutting blades 32 which play between the rear ends of the cutting blades 20 to cut the soil therebetween as the soil passes rearwardly while the machine proceeds forwardly. It will be noted that the blades 32 of each series are arranged spirally on the drum.

On the forward portion of the frame 10 is a second depending yoke member 33 which serves to guide the forward portion of the frame 18 in its upward and downward movements, and prevents any tendency toward lateral movement thereof.

The forward axle is provided with the draft means 34 by means of which the same may be drawn over the ground.

It will thus be seen that as the device is drawn over the ground the cutting blades 20 will cut into the ground and separate the same into long slices which will be of a depth equal to that of the knives or blades, and as the soil passes between the rear ends of the said blades the blades 32, of the drum, will cut the soil, between the blades 20, to the proper degree of fineness, the pulverized soil passing to the rear in the desired state of mellowness. Furthermore, by means of the lifting or lowering of the frame 18, the blades 20 can be caused to cut into the soil to the depth desired. It will also be readily understood that as the soil passes between the rear ends of the blades 20, the knives or blades 32 will cut therethrough in rapid succession, thus producing the proper and desired degree of fineness of the soil.

Carried by the inner face of the hub of the wheels 13 are the lugs 34 which are adapted to engage with the lugs 35 carried by a sliding sleeve 36 keyed on the axle, adjacent the wheel. Both of these sleeves are adapted to be shifted out of engagement with the lugs of the wheels whereby the wheels will rotate without driving the sprockets.

Carried on the outer end of each hub of the wheels 13 is a circular casing, and in each casing there are mounted the pawls 37 which engage with the teeth of a ratchet wheel 38 carried by the outer end of the hub. Thus the machine can be backed without driving the chains 17, the pawls sliding idly over the ratchet teeth.

What is claimed is:

A pulverizer comprising a plurality of spaced, parallel, vertical blades disposed longitudinally of the pulverizer, and a rotatable drum having its axis to the rear of the blades, the drum having a plurality of series of radiating cutting blades, the blades of the several series being parallel and progressing helically of the drum, the blades being disposed to operate downwardly and rearwardly only between the corresponding first named blades and having their cutting edges progressing outwardly from the drum and curving in a direction opposite to that of rotation of the drum.

In testimony whereof I affix my signature in the presence of two witnesses.

CALIXTE HEBERT.

Witnesses:
SAM SIMPSON,
NINA BOYLES.